United States Patent [19]
Andree

[11] 3,804,478

[45] Apr. 16, 1974

[54] SINGLE-ROW ANGULAR CONTACT BALL BEARING

[75] Inventor: Dietrich Andree, Sadelhof, Germany

[73] Assignee: Hoesch Aktiengesellschaft, Dortmund, Germany

[22] Filed: May 1, 1972

[21] Appl. No.: 248,954

[30] Foreign Application Priority Data
May 4, 1971 Germany............................ 7117238

[52] U.S. Cl. .............................................. 308/227
[51] Int. Cl. .......................................... F16c 19/10
[58] Field of Search ........... 308/227, 196, 231, 234, 308/195

[56] References Cited
UNITED STATES PATENTS
3,370,899   2/1968   Eklund................................ 308/193
3,482,892   12/1969   Schluter et al...................... 308/227

FOREIGN PATENTS OR APPLICATIONS
524,395   5/1921   France................................ 308/195

*Primary Examiner*—Charles J. Myhre
*Assistant Examiner*—Frank Susko
*Attorney, Agent, or Firm*—Michael S. Striker

[57] ABSTRACT

A single-row angular-contact ball bearing wherein an annulus of balls engages the concave external race surface of the inner race and the concave internal race surface of the outer race. The outer race has a circumferentially complete or arcuate ball confining portion which is outwardly adjacent to but spaced from the race surface of the inner race and is normally out of contact with the balls. The inner race has a circumferential complete or arcuate ball confining portion which is inwardly adjacent to but spaced from the race surface of the outer race and is normally out of contact with the balls. The material of those portions of the races which define the respective race surfaces is a hardened metal, and the material of the confining portions is unhardened metal. The confining portions may be integral with or are produced separately and thereupon assembled with the respective races.

9 Claims, 3 Drawing Figures

3,804,478

SINGLE-ROW ANGULAR CONTACT BALL BEARING

BACKGROUND OF THE INVENTION

The present invention relates to antifrictional bearings in general, and more particularly to improvements in single-row angular-contact antifrictional bearings which preferably employ rolling elements in the form of balls.

In certain presently known single-row angular-contact ball bearings, the direction of action of forces is inclined through an angle of between 30° and 60° with reference to the horizontal. Such bearings are capable of standing certain axial as well as certain radial stresses provided that the distance between the center of the bearing and the point of attack of the resultant external force does not exceed 60 percent of the radius of the circle defined by the centers of the rolling elements. However, it can happen again and again that the resultant of external forces acts on the bearing outside of the annulus of rolling elements, for example, in the event of a serious accident involving a crane or another machine which is used in construction and/or road building, whereby such forces cause a separation of the inner and outer races of the bearing with likelihood of great damage and/or serious accidents. In order to prevent such separation of inner and outer races in response to the application of extreme static loads, the presently known single-row angular-contact bearings must be provided with complex and expensive safety devices, such as intercepting straps or a second bearing which acts in the opposite direction. It is also known to utilize for such purposes single-row four-point contact antifrictional bearings or so-called cross-roller bearings as a substitute for single-row angular-contact ball bearings.

SUMMARY OF THE INVENTION

An object of the invention is to provide a novel and improved single-row angular-contact antifrictional bearing wherein the separation of inner and outer races in response to the application of extreme static loads is prevented in a simple material- and cost-saving manner.

Another object of the invention is to provide a single-row angular-contact antifrictional ball bearing which can take up substantial axial and radial stresses and in which the rolling elements are permanently confined in the space between the inner and outer races.

A further object of the invention is to provide a single-row angular-contact ball bearing which can be used with particular advantage in machines, vehicles and/or other types of apparatus wherein such bearing or a set of such bearings must support extremely heavy and bulky parts which could cause much damage and serious injuries in the event of an accident.

The invention resides in the provision of a single-row angular-contact antifrictional bearing, preferably a ball bearing, which comprises coaxial inner and outer races respectively having radially and axially offset first and second concave race surfaces, an annulus of rolling elements disposed between and normally contacting the first and second race surfaces, and first and second confining means for the rolling elements. The first and second confining means are respectively provided on the inner and outer races and are normally out of contact with the rolling elements. One of the confining means is located radially outwardly of and is spaced apart from one of the race surfaces, and the other confining means is located radially inwardly of and is spaced apart from the other race surface. Each of the confining means preferably consists at least in part of unhardened metallic material and each thereof is preferably provided with a conical confining surface which is adjacent to but normally spaced from the rolling elements. The gaps between the confining means and the adjacent race surfaces are radially and axially offset relative to each other.

At least one of the races may comprise a plurality of sections one of which is provided with the respective race surface and the other of which is provided with the respective confining surface. Each such section may be a ring but the other section may include one or more arcuate ring segments.

The novel features which are considered as characteristic of the invention are set forth in particular in the appended claims. The improved antifrictional bearing itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
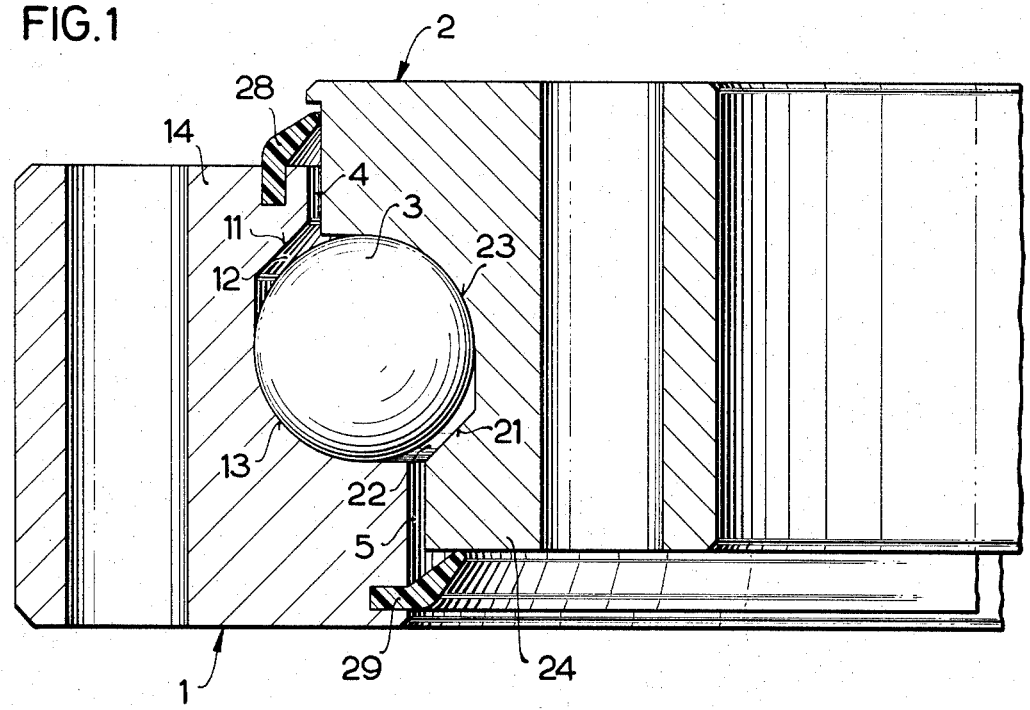
FIG. 1 is a fragmentary axial sectional view of a single-row angular-contact ball bearing which embodies one form of the invention.

Referring first to FIG. 1, there is shown a portion of a single-row angular-contact antifrictional ball bearing which comprises an inner race 2, an outer race 1 and an annulus of spherical rolling elements 3 (hereinafter called balls) between the two races. The inner race 2 has a concave race surface 23 and the outer race 1 has a concave race surface 13 which is axially and radially offset relative to the race surface 23. The balls 3 are normally in contact with both race surfaces 13 and 23, and the metallic material of the races 1, 2 adjacent to the respective race surfaces 13, 23 is hardened. In view of the kinematics of the bearing, the race surfaces 13, 23 are machined and finished with a high degree of precision and their mutual positions are selected in such a way that the length of arcs along which they contact the balls 3 is a function of the load to which the antifrictional bearing is subjected in use.

The outer race 1 is provided with ring-shaped confining means 14 which is located radially outwardly of the race surface 23 and is separated from the inner race 2 by an annular gap 4 normally sealed from the exterior by a deformable sealing element or packing 28 which is mounted in the confining means 14. The confining means 14 has a conical confining or intercepting surface 11 which is normally separated from the balls 3 by a predetermined clearance 12. The inner race 2 is also provided with ring-shaped confining means 24 which is located radially inwardly of the race surface 13 and is separated from the outer race 1 by an annular gap 5 whose width is preferably identical with that of the gap 4 and which is normally sealed from the exterior by an annular sealing element or packing 29 mounted in the outer race 1. The conical confining surface 21 of the confining means 24 on the inner race 2 is normally separated from the balls 3 by a clearance 22 whose width is preferably identical with that of the clearance 12. The clearances 12, 22 respectively communicate with the gaps 4, 5 and the two gaps are axially and radially offset relative to each other. The confining means 14 and 24 may consist at least in part of unhardened metallic material.

The purpose of the conical surfaces 11, 22 on the confining means 14, 24 is to intercept the balls 3 in the event of extreme static loads upon the bearing, i.e., such loads which tend to move the races 1 and 2 axially and away from each other so that the race surface 13 moves away from the race surface 23 or vice versa. Such extreme static loads can develop in the event of a severe accident involving the machine, vehicle or other apparatus in which the single-row angular-contact antifrictional ball bearing of FIG. 1 is put to use. For example, the confining means 14 and 24 may prevent complete separation of the races 1 and 2 in a crane or another apparatus wherein the separation of races 1 and 2 could result in overturning or crashing of a boom, housing or the like with attendant danger to property and human life. Under normal operating conditions, the balls 3 contact only the race surfaces 13, 23 and are separated from the confining or intercepting surfaces 11, 21 of the confining means 14, 24 by the aforementioned clearances 12, 22 of identical width. Therefore, the confining means 14 and 24 do not influence the kinematics of the bearing and the friction between the balls 3 and races 1, 2. This is the reason why the material of the confining means 14, 24 need not be a hardened metal. This also reduces the manufacturing cost of the bearing. Furthermore, the confining means 14, 24 need not be machined with a high degree of precision since they are not expected to engage the balls 3 in actual use of the bearing.

Figure 2:
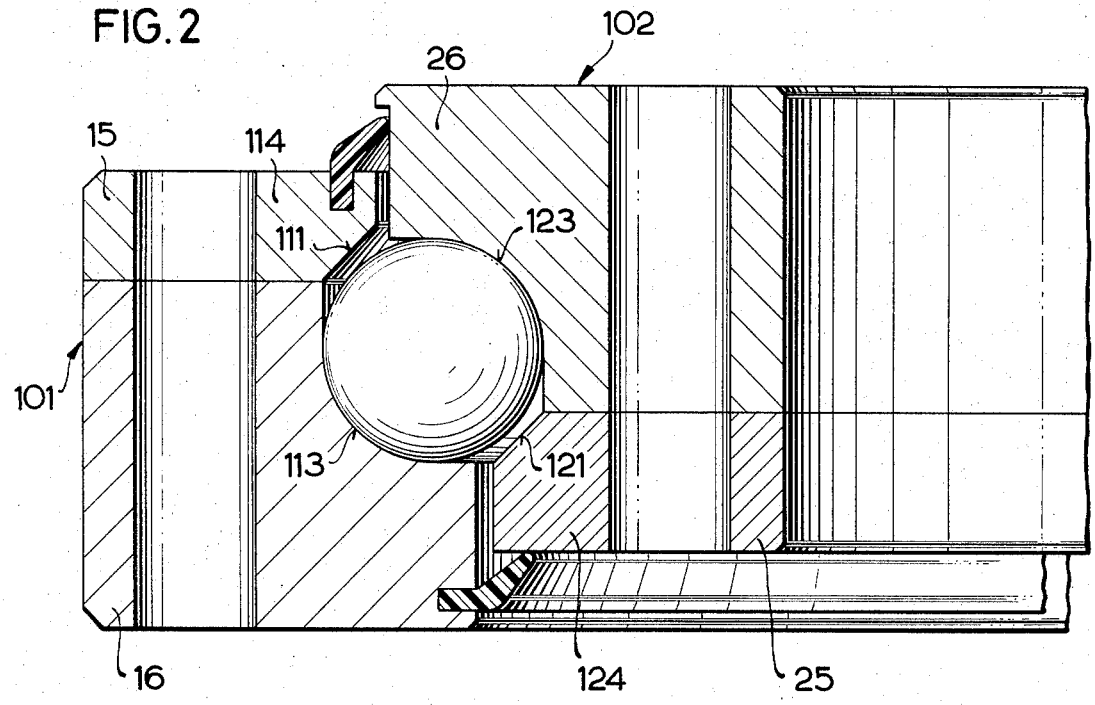
FIG. 2 is a similar fragmentary axial sectional view of a second single-row angular-contact ball bearing wherein each race consists of two ring-shaped sections.

FIG. 2 illustrates a portion of a second single-row angular-contact antifrictional ball bearing wherein all such parts which are clearly analogous to or identical with the corresponding parts of the bearing shown in FIG. 1 are denoted by similar reference characters plus 100. The main difference between the bearings of FIGS. 1 and 2 is that at least one but preferably both races 101, 102 of the bearing of FIG. 2 consist of a plurality of sections to facilitate assembly of the bearing and/or on account of loads to which the bearing is subjected in use. FIG. 2 shows that the outer race 101 consists of two ring-shaped sections 15, 16 which are permanently or separably connected to each other. The section 15 is provided with the confining means 114 having a conical confining or intercepting surface 111, and the section 16 is provided with the concave race surface 113. The section 26 of the inner race 102 is provided with a concave race surface 123, and the section 25 of the race 102 is provided with confining means 124 having a conical confining or intercepting surface 121. The sections 15, 25 may consist of unhardened metal and the sections 16, 26 preferably consist of hardened metal. At least one of the ring-shaped sections 15, 16, 25, 26 may be provided with one or more annuli of gear teeth (not shown) so as to be capable of meshing with a pinion or gear which serves to drive the respective race.

Figure 3:
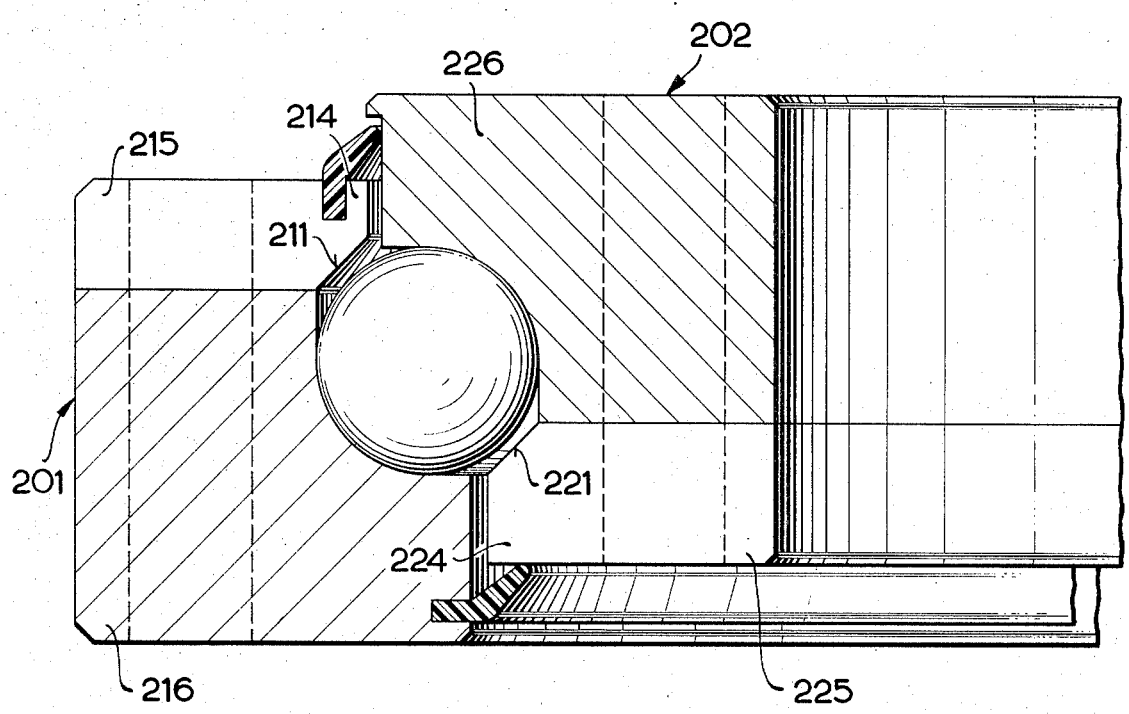
FIG. 3 is a similar fragmentary axial sectional view of a third single-row angular-contact ball bearing wherein each race consists of a ring and one or more arcuate ring sections.

FIG. 3 illustrates a portion of a third single-row angular-contact antifrictional ball bearing wherein all such parts which are clearly analogous to or identical with the corresponding parts of the bearing shown in FIG. 2 are denoted by similar reference charactacters plus 100. The main difference between the bearings of FIG. 2 and 3 is that the ring-shaped sections 15, 25 of FIG. 2 are replaced with arcuate sections or ring segments 215, 225 which respectively form part of the races 201, 202 and are respectively provided with confining means 214, 224. Each of the races 201, 202 can be provided with a single arcuate segment or with two or more such segments, depending on the length of such segments (as considered in the circumferential direction of the respective races) and on the desired strength of the assembled bearing.

An important advantage of the improved single-row angular-contact bearing is that it is capable of confining or intercepting the rolling elements even in the event of a catastrophe, such as a serious accident, by preventing total separation of the inner and outer races from each other. As mentioned above, this is of particular importance in road building, construction and other machinery where a crashing or overturned part of a machine could cause substantial material damage as well as serious injuries or death of workmen and/or bystanders.

Without further analysis, the foregoing will so fully reveal the gist of the present invention that others can, by applying current knowledge, readily adapt it for various applications without omitting features which fearly constitute essential characteristics of the generic and specific aspects of my contribution to the art and, therefore, such adaptation should and are intended to be comprehended within the meaning and range of equivalence of the claims.

What is claimed as new and desired to be protected by Letters Patent is set forth in the appended claims:

1. A single-row angular contact antifrictional bearing, comprising coaxial inner and outer races respectively having radially and axially offset first and second concave race surfaces, each of said races comprising a first portion consisting of hardened metal and defining the respective race surface and a second portion consisting of unhardened metal; an annulus of rolling elements disposed between and normally contacting said race surfaces; and first and second confining means for said rolling elements, said first and second confining means respectively constituting the second portions of said inner and outer races and being normally out of contact with said rolling elements, one of said confining means being located radially outwardly of one of said race surfaces and the other of said confining means being located radially inwardly of the other of said race surface.

2. A bearing as defined in claim 1, wherein said first confining means defines with said outer race a first gap and said second confining means defines with said inner race a second gap, said gaps being axially and radially offset relative to each other.

3. A bearing as defined in claim 1, wherein at least one of said races comprises a plurality of sections one of which is provided with the respective race surface and the other of which is provided with the respective confining means.

4. A bearing as defined in claim 3, wherein each of said sections is a ring.

5. A bearing as defined in claim 1, wherein said first race surface is located radially inwardly of said second race surface, said first confining means being located radially inwardly of said second race surface and said second confining means being located radially outwardly of said first race surface.

6. A bearing as defined in claim 1, wherein said confining means are normally separated from said rolling elements by clearances of identical width.

7. A bearing as defined in claim 1, wherein said first and second confining means respectively define with said outer and inner races first and second gaps and said first and second confining means normally define with said rolling elements first and second clearances, said first and second clearances respectively communicating with said first and second gaps.

8. A single-row angular contact antifrictional bearing, comprising coaxial inner and outer races respectively having radially and axially offset first and second concave race surfaces; an annulus of balls disposed between and normally contacting said race surfaces; and first and second confining means for said balls, said first and second confining means being respectively provided on said inner and outer races, one of said confining means being located radially outwardly of one of said race surfaces and the other of said confining means being located radially inwardly of the other of said race surfaces, each of said confining means consisting at least in part of unhardened metallic material and having a conical confining surface adjacent to but normally spaced from said balls.

9. A single-row angular contact antifrictional bearing, comprising coaxial inner and outer races at least one of which comprises a plurality of sections and each of which has a concave race surface which is radially and axially offset with respect to the race surface of the other race; an annulus of rolling elements disposed between and normally contacting said race surfaces; and first and second confining means for said rolling elements, said first and second confining means being respectively provided on said inner and outer races and being normally out of contact with said rolling elements, one of said confining means being located radially outwardly of one of said race surfaces and the other of said confining means being located radially inwardly of the other of said race surfaces, one section of said one race being provided with the respective race surface and another section of said one race including at least one arcuate ring segment provided with the respective confining means.

* * * * *